United States Patent [19]

Watanabe et al.

[11] Patent Number: 4,675,572
[45] Date of Patent: Jun. 23, 1987

[54] WRITE HEAD OF OPTICAL PRINTER

[75] Inventors: Hiroshi Watanabe; Kiyoshi Morimoto, both of Mobara, Japan

[73] Assignee: Futaba Denshi Kogyo Kabushiki Kaisha, Morbara, Japan

[21] Appl. No.: 839,544

[22] Filed: Mar. 14, 1986

[30] Foreign Application Priority Data

Mar. 15, 1985 [JP] Japan .................... 60-051842

[51] Int. Cl.⁴ .................... H01J 63/02; G01D 15/06
[52] U.S. Cl. .................... 313/495; 313/497; 346/161
[58] Field of Search ............ 313/495, 496, 497, 422, 313/293, 295; 355/3 R, 14 E; 346/107, 108, 110 R, 160, 161; 340/724; 178/15, 30, 17 D

[56] References Cited

U.S. PATENT DOCUMENTS 2,639,398  5/1953  Jacobi et al. .................... 313/110 X
4,551,737 11/1985  Inokuchi .................... 313/496 X Primary Examiner—Palmer C. DeMeo
Assistant Examiner—Sandra L. O'Shea
Attorney, Agent, or Firm—Oblon, Fisher, Spivak, McClelland & Maier

[57] ABSTRACT

A write head of optical printer utilizing the principle of a vacuum fluorescent display device which is capable of forming a sufficient grid gap between each adjacent two grids and accurately and readily accomplishing the arrangement of the grids is disclosed. The write head is constructed in such a manner that grids are arranged above a plurality of parallel strip-like anode conductors arranged on a substrate so as to obliquely cross a row of the anode conductors, phosphor layers are deposited on the anode conductors so as to be opposite to the grids to form light emitting picture cells, and an array of the light emitting picture cells in each grid is formed separately.

7 Claims, 7 Drawing Figures

WRITE HEAD OF OPTICAL PRINTER

BACKGROUND OF THE INVENTION

1. Field of the Invention

This invention relates to a write head of optical printer, and more particularly to a write head of optical printer utilizing the principle of a vacuum fluorescent display device.

2. Description of the Prior Art

Optical printers utilizing various kinds of write heads have been proposed. The optical printer is generally constructed in such a manner as shown in FIG. 1. More specifically, the printer includes a photosensitive drum 1, and an electrifier 2, a write head 3, a developing device 4, an erasing lamp 5 and a cleaning blade 6 arranged around the photosensitive drum 1 in order in the clock-wise direction. A decalcomania paper 8 fed from a cassette 7 is moved linearly while being contacted with the drum 1 which is rotated in the direction indicated by the arrow or the clockwise direction. Reference numeral 9 designates a decalcomania or transferring heater.

Conventionally, an LED (light-emitting diode), an LCD (liquid crystal display) or the like is generally used as a write head in the optical printer. However, the LED is disadvantageous in that it fails to exhibit sufficient luminance at a wavelength suitable for writing operation, whereas the LCD is slow in shuttering operation for intermitting a rear light source in response to applied voltage. Accordingly, it is unable for these write heads to be operated by a dynamic drive, but operated by a static drive as shown in FIG. 2. The write head of the static driving type comprises a picture cell array 10 disposed on a substrate. The picture cell array 10 includes light emitting picture cells A, such as, for example, an LED or an LCD, linearly arranged together with a rear light source and is provided with a wiring 11 in each of the light emitting picture cells A.

As explained hereinabove, the write head of the static driving type is provided with the wiring 11 independently every light emitting picture A which is outwardly led out from the picture cell A. As a result, the number of the wirings 11 led out from the picture cell A becomes too numerous, and each of the wirings must be connected independently at the exterior of the write head when it is used for an optical printer which includes light emitting picture cells arranged at intervals as small as about 0.1 mm. As a result, the connection of the respective wirings is extremely troublesome and complicated, because a space required for leading out the wirings is insufficient due to the structural limitation of the write head.

In order to eliminate the above problem, a write head of optical printer as shown in FIG. 3 has been proposed which utilizes the principle of a vacuum fluorescent display device and employs a dynamic driving system. More particularly, the write head shown in FIG. 3 includes a picture cell array 10 which comprises light emitting picture cells A each comprising a phosphor layer deposited on an anode and arranged on a straight line having an interval therebetween and is divided into a plurality of groups 12a, 12b, 12c - - -. The corresponding picture cells A in each of the groups 12 are connected together by a common wiring, and grids G1, G2, G3 - - - are arranged above the light emitting picture cells A of the respective groups 12 so as to correspond thereto.

In the write head of the dynamic driving type described above, the corresponding light emitting picture cells in each of the groups are connected together by a common wiring. Thus, the problems inherent in the write head of the static driving type are effectively eliminated. However, the grid G is provided in each group 12 and it must be electrically separated from one another defining a grid gap S between the each adjacent two grids G and between the light emitting picture cells A. Accordingly, in the write head shown in FIG. 3, it is highly difficult to ensure an area necessary to form the grid gap S between the adjacent light emitting picture cells which are arranged at micro-intervals. Furthermore, the grid gap S and the interval between the picture cells prevent light emitted from the picture cells from forming together a full line along the direction of arrangement of the picture cells when the light is projected on a photosensitive drum. As a result, lines or characters formed of dots are printed on a decalcomania paper.

SUMMARY OF THE INVENTION

The present invention has been made in view of the foregoing disadvantage of the prior art which is resulted from the problems in ensuring of the grid gap due to the structural limitation of the vacuum fluorescent write head for use in an optical printer, while taking notice of the fact that arrangement of strip-like grids above strip-like phosphor-deposited anode conductors in a manner to obliquely cross a row of the anode conductors can effectively eliminate the above disadvantage of the prior art and provide sufficient grid gaps between each adjacent two grids.

Accordingly, it is an object of the present invention to provide a write head of optical printer utilizing the principle of a vacuum fluorescent display device of the dynamic driving type which is capable of providing a sufficient grid gap between each adjacent two grids.

It is another object of the present invention to provide a write head of optical printer utilizing the principle of a vacuum fluorescent display device of the dynamic driving type which is capable of accurately and readily arranging grids maintaining a sufficient grid gap therebetween.

It is a further object of the present invention to provide a write head of optical printer utilizing the principle of a vacuum fluorescent display device of the dynamic driving type which is capable of allowing light emitted from each of picture cells to overlap or register so that a straight full line may be delineated on a photosensitive drum when the drum is rotated.

It is a still further object of the present invention to provide a write head of optical printer utilizing the principle of a vacuum fluorescent display device which is capable of significantly improving the quality of printing.

In accordance with the present invention, the foregoing and other objects are attained by providing a write head of optical printer which comprises a substrate, a plurality of strip-like anode conductors arranged on the substrate in a manner to be parallel to one another having intervals therebetween, a plurality of strip-like grids each having a grid aperture which are arranged above strip-like anode conductors in a manner to obliquely cross a row of the anode conductors arranged and to be parallel to one another having intervals therebetween, and phosphor-deposited anodes provided on the anode conductors so as to opposite to the grids.

BRIEF DESCRIPTION OF THE DRAWINGS

These and other objects and many of the attendant advantages of the invention will be readily appreciated as the same becomes better understood by reference to the following detailed description when considered in connection with the accompanying drawings in which like reference numerals designate like or corresponding parts throughout; wherein.

DETAILED DESCRIPTION OF THE PREFERRED EMBODIMENTS

Now, a write head of optical printer according to the present invention will be described hereinafter with reference to FIGS. 4 to 7.

Figure 4:
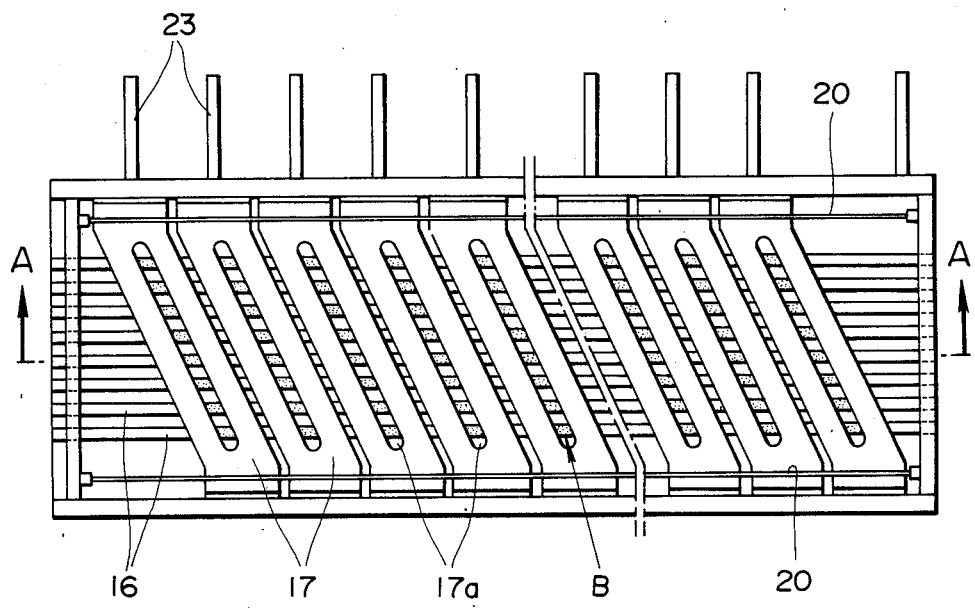
FIG. 4 is a plan view showing an embodiment of a write head of optical printer of the dynamic driving type according to the present invention.
Figure 5:
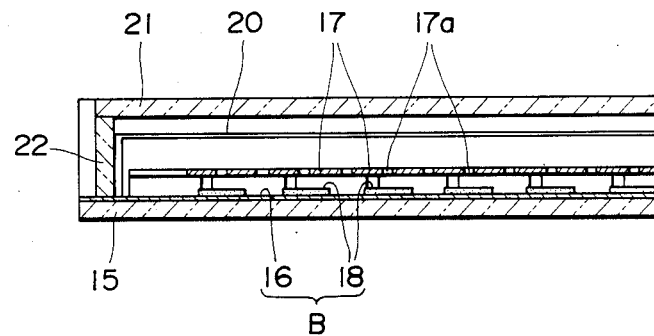
FIG. 5 is a sectional view taken along line A—A of FIG. 4.
Figure 6:
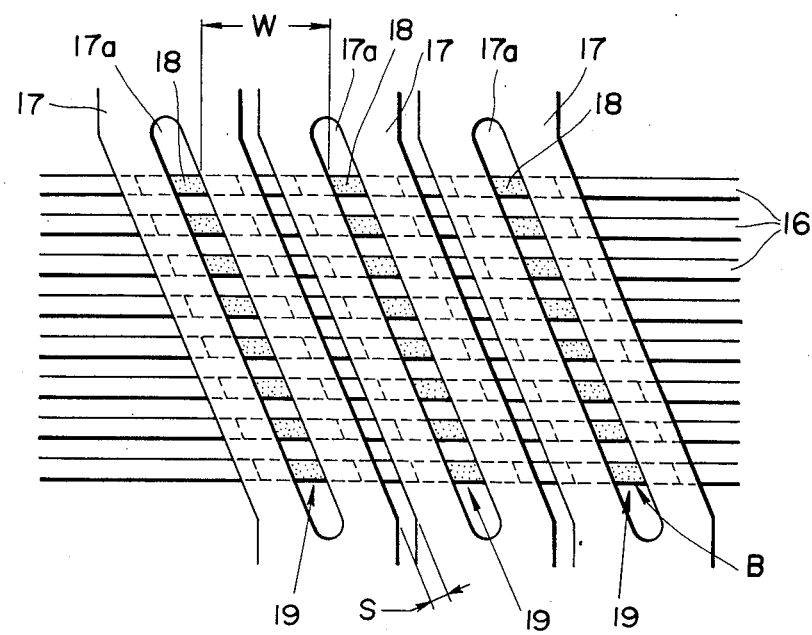
FIG. 6 is an enlarged view showing the essential part of the write head of optical printer shown in FIG. 4.

FIGS. 4 to 6 show an embodiment of a write head of optical printer according to the present invention. The write head of the illustrated embodiment, as shown in FIGS. 4 and 5, includes a substrate 15, a plurality of strip-like anode conductors 16 arranged on the substrate 15 in a manner to be parallel to one another at fixed intervals, and a plurality of grids 17 arranged above the anode conductors 16 in a manner to obliquely cross a row of the anode conductors 16 and to be parallel to one another at fixed intervals. The grids 17 each are formed of a flat plate member and is provided at a central portion thereof with an elongated grid aperture 17a extending in the direction of obliquely crossing the array of the anode conductors 16.

The anode conductors 16, as best shown in FIG. 6, each have a plurality of phosphor layers 18 deposited on portions thereof opposite to the grid apertures 17a of the grids 17 and the portions adjacent thereto at fixed intervals so as to serve as light emitting picture cells. The phosphor-deposited anode conductors thus formed constitute anodes B. The light emitting picture cells obliquely arranged along the grid aperture 17a in each of the grids 17 constitute each one group 19 of the light emitting picture cells 19. Also, the light emitting picture cells in each group 19 are arranged so as to prevent any gap from being formed between the each adjacent two picture cells when viewed in the direction perpendicular to the row of the anode conductors 16.

Now referring to FIGS. 4 and 5 again, the write head of the illustrated embodiment also includes a filamentous cathode 20 stretched above the strip-like anode conductors 16 and grids 17. Reference numeral 21 and 22 designate a front plate and side walls, respectively, which constitute, in cooperation with the substrate, a hermetically sealed casing which is adapted to be kept at high vacuum pressure by evacuation. Reference numeral 23 indicates grid terminals.

In the illustrated embodiment, the grid aperture 17a of each of the grids 17, as described above, is formed into an elongated shape. However, it is not limited to such a shape.

Figure 7:
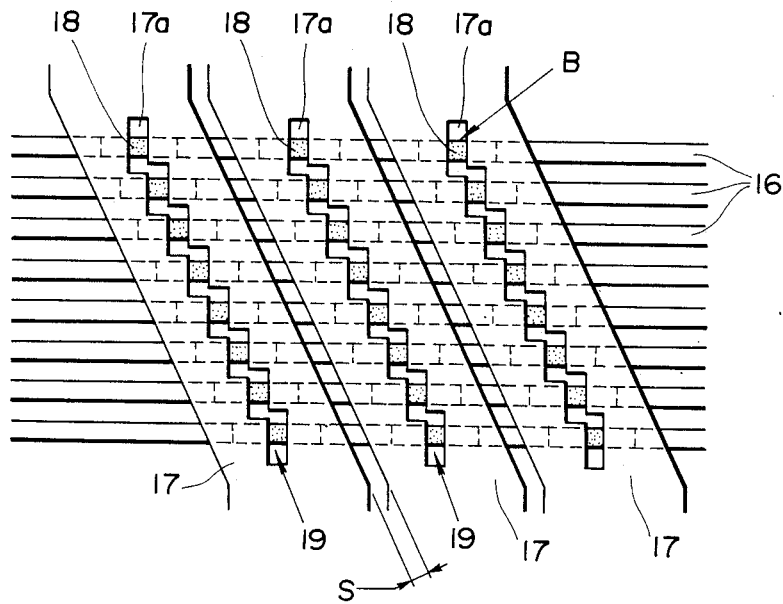
FIG. 7 is an enlarged view showing the essential part of another embodiment of a write head of optical printer according to the present invention.

FIG. 7 illustrates another embodiment of a write head according to the present invention, wherein grids 17 each are formed with a grid aperture 17a of a shape different from that of the grid in the embodiment shown in FIGS. 4 to 7. More particularly, it may be formed into, for example, a stair-like shape so as to have portions perpendicular to anode conductors 16. The formation of the grid aperture 17a into such a shape permits the portions of phosphor layers 18 which are defined by the grid aperture 17a in each grid 17 and act as light emitting picture cells to have a rectangular shape. The phosphor layers 18 of the anode conductors 16 covered with each of the grids 17 are arranged along the grid. Accordingly, the grids 17 are arranged in the direction of obliquely crossing a row of the anode conductors 16 substantially in the same manner as the embodiment shown in FIG. 6. The remaining part of the embodiment shown in FIG. 7 is constructed in substantially the same manner as that shown in FIGS. 4 to 6.

In each of the embodiments described above, as shown in FIGS. 6 and 7, each of the grids 17 is arranged to have a sufficient distance between the each adjacent two groups 19 of the light emitting picture cells or between the lowermost phosphor layer 18 of each group 19 and the uppermost phosphor layer of the group adjacent thereto. In other words, each adjacent two phosphor layers 18 arranged on each anode conductor 16 can be widely separated by the distance W so that the phosphor layers 18 of each group 19 may be obliquely covered by the grids 17 maintaining the distance S between the each adjacent two grids 17. Therefore, the phosphor layers 18 arranged on each anode conductor 16 and acting as the light emitting picture cells are framed by the apertures 17a of the grids 17 so that the periphery of each light emitting picture cell may be clearly defined without requiring the depositing operation of phosphor layers on each anode conductor with high accuracy.

In the embodiments described above, the grid 17 formed of a flat plate member is provided with the continuous aperture 17a. However, the present invention is not limited to such construction. For example, the grids each may be provided with a plurality of independent apertures opposite to the respective phosphor layers 18.

Figure 1:
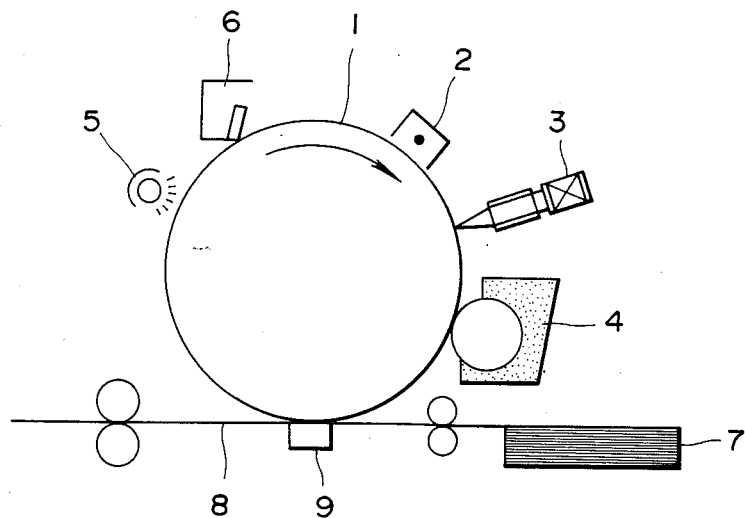
FIG. 1 is a schematic view generally showing an optical printer.
Figure 2:
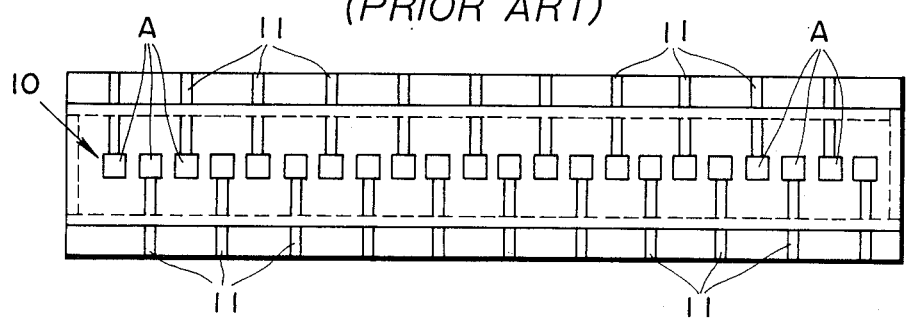
FIG. 2 is a schematic view showing a conventional write head of optical printer of the static driving type.
Figure 3:
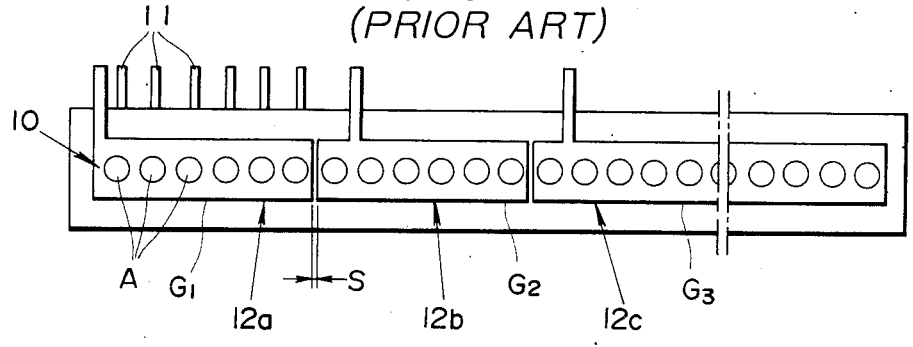
FIG. 3 is a schematic view showing a conventional write head of optical printer of the dynamic driving type.

In the present invention, the picture cell arrays in each group are linearly arranged to be slanted with respect to the axis of the photosensitive drum shown in FIG. 1. However, suitable electric signal processing is conducted to adjust the timing of light emission of each phosphor layer so that the light emitted from the picture cell array may align parallel to the axis of the photosensitive drum when the light is projected on the drum. In this instance, when the distance W between the adjacent two light emitting picture cells on each anode conductor is determined to allow an image formed on the photosensitive drum by scanning each of the light emitting picture cells in each group synchronous with the rotation of the photosensitive drum to overlap or register on the axis of the drum, it is possible to have the image formed by the respective light emitting picture cells on the photosensitive drum aligned on a line parallel to the axis of the drum.

As can be seen from the foregoing, the write head of optical printer of the present invention is constructed in such a manner that the grids are arranged above a plurality of parallel striplike anode conductors arranged on the substrate so as to obliquely cross a row of the anode conductors. The phosphor layers are deposited on the anode conductors so as to be opposite to the grids to form light emitting picture cells, and an array of the light emitting picture cells in each grid is separately formed. This makes it possible to separate the grids electrically and mechanically from one another between the adjacent phosphor layers of the respective adjacent groups of the light emitting picture cell array.

Accordingly, the write head of the present invention can form the sufficient grid gap between the each adjacent two grids, and accurately and readily accomplish the arrangement of the grids.

Also, the write head of the present invention is free of any gap between the adjacent light emitting picture cells. Thus, the printing in the direction of the anode conductors may be carried in a full line thereby to improve quality of the printing.

While preferred embodiments of the invention have been described with a certain degree of particularity with reference to the drawings, obvious modifications and variations are possible in the light of the above teachings. It is therefore to be understood that within the scope of the appended claims, the invention may be practiced otherwise than as specifically described.

What is claimed as new and desired to be secured by letters patent of the United States is:

1. A write head of optical printer comprising:
    an evacuated casing having a substrate, side walls and a front plate;
    a plurality of strip-like anode conductors arranged on said substrate, said anode conductors being arranged in parallel baving intervals between each adjacent two anode conductors;
    phosphor layers deposited on each of said anode conductors;
    a plurality of grids each having a grid aperture, said grids being arranged above said strip-like anode conductors so as to have said grid aperture opposite to said phosphor layers obliquely crossing a row of said anode conductors and being in parallel having gaps between each adjacent two grids; and
    at least one cathode electrode mounted in said evacuated casing for emitting electrons to be impinged upon said phosphor layers.

2. The write head of optical printer as defined in claim 1, wherein said phosphor layers are deposited on portions of said anode conductors.

3. The write head of optical printer as defined in claim 1, wherein said grid aperture is formed into an elongated shape.

4. The write head of optical printer as defined in claim 1, wherein said grid aperture is formed into stair-like shape.

5. The write head of optical printer as defined in claim 1, wherein said grid aperture is a continuous aperture.

6. The write head of optical printer as defined in claim 1, wherein said grid aperture consists of a plurality of independent apertures.

7. The write head of optical printer as defined in any of claims 1–4, wherein said phosphor layers deposited on each anode conductor opposite to said grid apertures in each grid are arranged so as to have light emitted from each of said phosphor layers linearly align on the axis of a rotating photosensitive drum.

* * * * *